US008733698B2

(12) United States Patent
Abrial et al.

(10) Patent No.: US 8,733,698 B2
(45) Date of Patent: May 27, 2014

(54) METHOD AND DEVICE FOR IMPLEMENTING THE THRUST REVERSERS OF AN AIRCRAFT

(75) Inventors: Philippe Abrial, Merville (FR); Philippe Feuillard, Gardouch (FR)

(73) Assignee: Airbus Operations (SAS), Toulouse Cedex (FR)

( * ) Notice: Subject to any disclaimer, the term of this patent is extended or adjusted under 35 U.S.C. 154(b) by 645 days.

(21) Appl. No.: 12/990,081

(22) PCT Filed: Apr. 30, 2009

(86) PCT No.: PCT/FR2009/000516
§ 371 (c)(1),
(2), (4) Date: Oct. 28, 2010

(87) PCT Pub. No.: WO2009/138598
PCT Pub. Date: Nov. 19, 2009

(65) Prior Publication Data
US 2011/0108665 A1    May 12, 2011

(30) Foreign Application Priority Data
May 6, 2008    (FR) ...................................... 08 02511

(51) Int. Cl.
*F02K 1/54*    (2006.01)
(52) U.S. Cl.
USPC ..................................................... 244/110 B

(58) Field of Classification Search
USPC ................ 60/770–772, 230, 228, 226.2, 204; 244/110 B, 75.1, 224, 1 R, 207, 53 R, 244/63, 110 A, 110 R
See application file for complete search history.

(56) References Cited

U.S. PATENT DOCUMENTS

| 3,618,880 A | 11/1971 | Hagaman et al. |
| 3,961,560 A | 6/1976 | Bader |
| 7,107,757 B2 * | 9/2006 | Andre et al. ................. 60/226.2 |
| 2005/0116096 A1 * | 6/2005 | Andre et al. ................. 244/75 R |
| 2010/0042267 A1 * | 2/2010 | Goodman et al. ................. 701/3 |

FOREIGN PATENT DOCUMENTS

FR    2872223 A1    12/2005

OTHER PUBLICATIONS

Written Opinion of the International Searching Authority, search completed Nov. 11, 2009 by the European Patent Office, for International Application No. PCT/FR2009/000516.

* cited by examiner

*Primary Examiner* — Valentina Xavier
(74) *Attorney, Agent, or Firm* — Novak Druce Connolly Bove + Quigg LLP

(57) ABSTRACT

Method and device for implementing the thrust reversers of an aircraft. According to the invention, the following successive steps are carried out automatically: • deployment (E3) of the previously armed thrust reversers of the aircraft; • application (E5) of a predetermined engine speed; reduction (E6) of the engine speed; —re-furling (E7) of the thrust reversers of the aircraft.

10 Claims, 3 Drawing Sheets

METHOD AND DEVICE FOR IMPLEMENTING THE THRUST REVERSERS OF AN AIRCRAFT

CROSS-REFERENCE TO RELATED APPLICATIONS

This application is a §371 national stage entry of International Application No. PCT/FR2009/000516, filed Apr. 30, 2009, which claims priority to French patent application Ser. No. 08/02511, filed May 6, 2008, the entire contents of which are incorporated herein by reference.

FIELD OF THE INVENTION

This invention relates to a method and a device for operating the thrust reversers of an aircraft, as well as an aircraft provided with such a device.

BACKGROUND OF THE INVENTION

It is known that civil aircrafts equipped with turbojets are provided with thrust reversers being able to improve their braking, more specifically while reducing the running distance on the ground, upon a landing or a takeoff interruption. The thrust reversers are associated with aircraft engines and can be controlled for being able to switch from an inactive folded position to an active deployed position and, reversely, from said active deployed position to said inactive folded position. After having adapted the speed of the engines, the pilot can trigger manually the deployment of the thrust reversers associated with such engines through control members of the lever type.

However, the thrust reversers are likely to untimely deploy, for example, as a result of an accidental action of the pilot on one of the control members. Moreover, a bad positioning of the throttle lever of one of the engines, when the thrust reversers of the set of engines are deployed, or an erroneous control of the thrust of the engines, when the thrust reverser of one of the engines is defective, could generate a dissymmetry of the overall thrust of the engines and result in difficulties for controlling the aircraft on the ground. Moreover, a significant decision time interval between the aircraft wheels touching the ground and the deployment of the thrust reversers by the pilot reduces the contribution of the thrust reversers to the aircraft braking and can lead to runway excursions.

SUMMARY OF THE INVENTION

The object of the present invention is to remedy these drawbacks.

To this end, the method for implementing thrust reversers, upon a landing or a takeoff, of an aircraft provided with at least two turboengines, the speeds of which are individually controlled, between the idling speed and the full speed, by throttle levers respectively associated with said engines, said thrust reversers being controlled by at least one control member for being able to switch from an inactive folded position to an active deployed position and, reversely, from said active deployed position to said inactive folded position, is remarkable in that the following successive steps are automatically performed:

a) a deployment of said beforehand armed thrust reversers when:
the speed of said engines is at the most equal to a predetermined low speed threshold;
the speed of the aircraft is higher than a first predetermined speed threshold; and
the aircraft is considered being in contact with the ground;
b) an application to said engines of a predetermined speed at least equal to said low speed threshold as long as the speed of the aircraft is higher than said first speed threshold;
c) as soon as the speed of said aircraft is at the most equal to said first speed threshold, a reduction of the speed of said engines so that they reach a speed at the most equal to said low speed threshold;
d) then, a folding of said thrust reversers.

Thus, thanks to this invention, the thrust reversers are automatically implemented, enabling to limit, or even to cancel the interventions of the pilot(s) upon the implementation of the reversers. The risk of human errors is then considerably reduced (untimely deployment/folding of the thrust reversers, unadapted thrust of the engines, etc.) upon such an implementation.

Moreover, the time interval between the wheels touching and the thrust reversers being deployed is nil or nearly nil, resulting in the braking distance being significantly reduced and therefore, the risk of the aircraft leaving the runway.

Preferably, said thrust reversers are folded when the speed of said aircraft is at the most equal to a second predetermined speed threshold, said second speed threshold being lower than said first threshold.

Additionally, said thrust reversers are armed if the following conditions are met:
the pilot has selected a reverse thrust corresponding to said predetermined speed to be applied to the engines at step b);
the pilot has put the control member of said thrust reversers in a predefined position, referred to as the automatic position;
the aircraft is in one of the two following configurations:
an approach configuration before a landing;
a takeoff configuration.

Advantageously, in the case of a breakdown of at least one of said thrust reversers, a new speed to be applied at step b) is determined for each one of said engines.

Thus, the reverse thrust dissymmetry generated by the defective thrust reverser is controlled and the controllability of the aircraft is improved.

Alternatively, in the case of a landing, the thrust reversers are armed if the following conditions are met:
the pilot has recorded landing parameters;
the pilot has put the control member of said thrust reversers in a predefined position, referred to as the automatic position;
the aircraft is in an approach configuration;
and said speed to be applied to the engines at step b) is determined as a function of said recorded parameters and of the actual landing conditions so as to be optimal.

Thus, when the pilot has for example programmed the desired runway exit bypass, the speed to be applied to the engines at step b) is determined automatically as a function of the wheels touching the runway with respect to the programmed exit bypass so as to adjust the braking of the aircraft.

Advantageously, before step b) is performed, the correct deployment of said thrust reversers is checked.

Furthermore, as a result of the pilot's voluntary action on at least one of the following means:
the control member of said thrust reversers;
a throttle lever associated with one of said engines; at least one of the steps a), b), c), d) is interrupted.

Thus, the pilot has the possibility to stop the automatic implementation of the thrust reversers and to manually continue the thrust reversal.

Advantageously, said low predetermined speed threshold is at least approximately equal to the idle speed.

For implementing the method according to this invention, a control device is advantageously provided, comprising:
- a deployment logic device for controlling said deployment of the thrust reversers;
- speed application logic devices each allowing said application of the predetermined speed to one of said engines to be controlled;
- speed reduction logic devices each allowing said reduction of the speed of one of said engines to be controlled; and
- folding logic devices each allowing said folding of the thrust reverser of one of said engines to be controlled.

Moreover, the control device comprises a position return logic device allowing said check of the correct deployment of said thrust reversers to be performed.

In addition, the control device is connected, via a link, to at least one of the following means of said aircraft:
- the flight controls;
- the controls of the landing gear;
- the flight data devices;
- the throttle lever device;
- the control member of said thrust reversers;

so as to receive signals representative of information able to be used by said logic devices for deployment, speed application, speed reduction, folding and position return.

Preferably, the control device is connected, via a link, to a control interface connected to an electronic control for said engines and to a control unit for said thrust reversers, so as to receive from said control interface information signals being able to be used by said logic devices for speed application, speed reduction, folding and position return and to transmit to it control signals respectively from said engines and said thrust reversers.

Furthermore, the present invention relates to an aircraft provided with a control device such as specified herein above.

BRIEF DESCRIPTION OF THE DRAWINGS

The figures of the appended drawing will better explain how this invention can be implemented. On these figures, like reference numerals relate to like components

DETAILED DESCRIPTION

Although in the embodiment in accordance with the invention, as herein after described, the aircraft is a two engine aircraft provided with thrust reversers, it will be easily understood that the system of the invention could also be arranged on a thrust reverser provided with a nozzle section varying device of the engine.

The speed of each one of the engines is individually controlled, between the idling speed and the full speed, by throttle levers respectively associated with said engines and actuated by the pilot(s).

In a preferred embodiment, the thrust reversers are controlled by means of a single control member 1, an embodiment of which is schematically shown in different positions on FIGS. 4A to 4D to be subsequently described.

Figure 1:
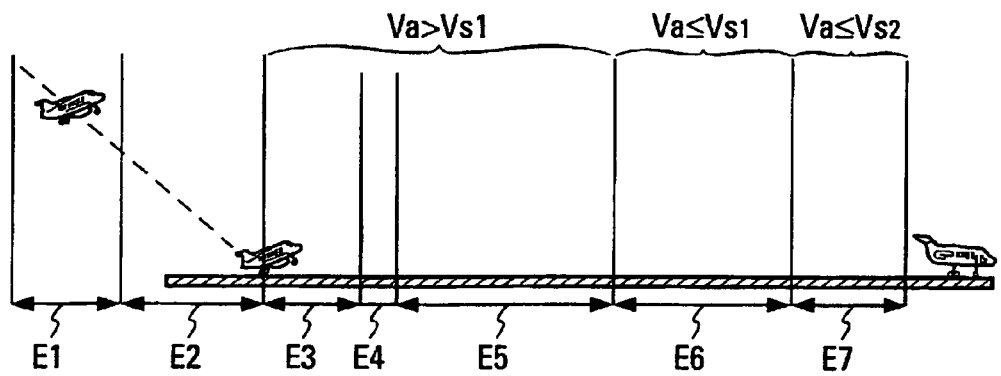
FIG. 1 illustrates the main steps of the method for automatically implementing the thrust reversers according to this invention upon an aircraft landing.

As shown on FIG. 1, the automatic implementation of the thrust reversers, referred to as the automatic mode, in accordance with the invention is as follows.

It is initially assumed that the aircraft is in an approach phase of a runway and in an approach configuration. The air brakes and the automatic brakes thereof are armed and the thrust reversers thereof are in an inactive folded position. The control member 1 occupies a predefined position (FIG. 4A), referred to as the retracted position. The automatic mode is not armed.

First of all, upon such an approach phase, the pilot selects (step E1), via the flight management system known in the aeronautic art under the abbreviation FMS (for Flight Management System), the thrust he wants to obtain in outlet of the thrust reversers when they are n the active deployed position. In the embodiment, the pilot can select a level of reverse thrust amongst three levels (for example minimum, intermediary, maximum) each corresponding to a predetermined speed (for example idling speed, intermediary speed, authorized maximum speed). In order to select the reverse thrust, the pilot can, for example, take into consideration the weather conditions and the characteristics of the runway (for example, the programmed exit bypass of the runway).

Figure 4A:
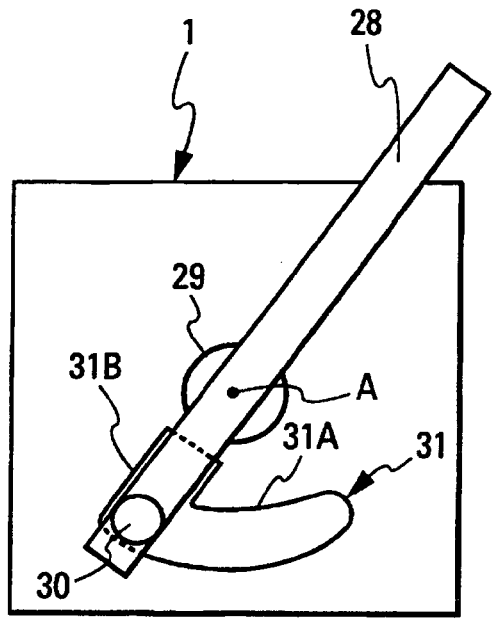
FIG. 4A schematically illustrates, in a cross-sectional view, the control member implemented by this invention, when it is in a retracted position.
Figure 4B:
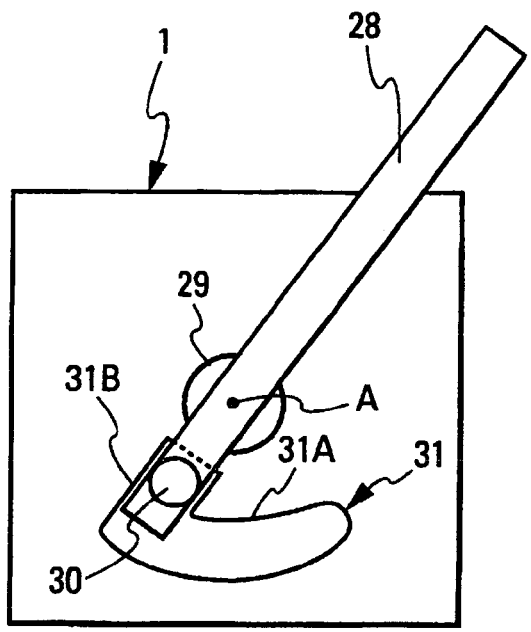
FIGS. 4B, 4C and 4D are figures analogous to FIG. 4A when the control member is respectively occupying the automatic, full stroke and half-stroke positions.

When the reverse thrust has been selected (step E1), the pilot activates the automatic mode (step E2) while bringing the control member 1 in an automatic position (FIG. 4B). The thrust reversers are then armed. For deactivating the automatic mode before the wheels touch the ground, the pilot can, for example, put the control member 1 into the retracted position.

Upon the wheels touching the ground, when the speed of the aircraft Va is preferably higher than a first predetermined speed threshold Vs1 (for example set at 70 kts) and the engines are at the idling speed (that is when the speed thereof is at the most equal to a low predetermined speed threshold), the deployment of the thrust reversers is controlled (step E3).

A check of the incident free deployment of the thrust reversers is subsequently performed (step E4). A deployment confirmation signal of the thrust reversers, in the case of a correct deployment thereof, can then be transmitted to the pilot, for example, in the form of a visual and/or a sound signal. On the other hand, in the case of an abnormal deployment of at least one of the thrust reversers of the aircraft, an incorrect deployment signal can be transmitted to the pilot.

When the deployment of the thrust reversers occurs correctly, the application of the predetermined speed to the engines is controlled (step E5), said predetermined speed corresponding to the level of reverse thrust selected by the pilot at step E1. At step E5, the speed of the engines is maintained substantially equal to the predetermined speed as long as the speed of the aircraft remains for example higher than the first speed threshold.

It should be appreciated that, when the deployment of at least one of the reversers has not occurred correctly, a new speed to be applied at step E5 is for example determined for each engine (including the engine with a defective thrust reverser), so as to check the reverse thrust dissymmetry generated by the defect of the reverser and to improve the controllability of the aircraft. The new speeds associated with each of the engines could be applied, as in the case of a correct deployment of the thrust reversers, as long as the speed of the aircraft remains higher than the first speed threshold.

As soon as the speed of the aircraft is at the most equal to said first speed threshold, the idling speed of the engines is controlled (step E6).

When the engines reach the idling speed (the speed of the engines is then at the most equal to the low threshold speed) and the speed of the aircraft is at the most equal to a second predetermined speed threshold Vs2 (for example, the second speed threshold is taken equal to 20 kts), folding of the thrust reversers of the aircraft is controlled (step E7).

The automatic implementation of the thrust reversers according to the invention is completed when the thrust reversers of the engines are in an inactive folded position.

Upon a takeoff being interrupted, the aircraft being initially in a takeoff configuration, the automatic implementation of the thrust reversers comprises, like that upon a landing, the above mentioned steps E1 to E7. It is however to be noticed that the steps wherein a reverse thrust E1 is selected and the automatic mode E2 is activated are performed preferably before the takeoff phase of the aircraft is initiated and step E3 of deployment of the thrust reversers can be triggered by the pilot abruptly idling the engines.

Moreover, upon a landing or a takeoff interruption of the aircraft, after a voluntary action of the pilot on the control member 1 (for example, the control member is put in a predefined position, referred to as the half-stroke position, to be subsequently described with reference to FIG. 4D) or on one of the throttle levers, one of the steps E3 to E7 can be interrupted for switching back to a manual implementation of the thrust reversers. The automatic mode is then de-activated and the pilot can for example control maintaining a reverse thrust in outlet of the reversers under the first speed threshold.

As an alternative of the embodiment in accordance with the invention, the pilot could program, at step E1, the desired exit bypass of the runway so that a selection of the optimum reverse thrust level is automatically performed at step E3 as a function of the actual landing conditions (for example, the position of the wheels touching the runway with respect to the programmed exit bypass, the weather conditions, etc.) and so that the corresponding speed is applied as long as the speed of the aircraft remains for example higher than the first speed threshold.

In the preferred embodiment of the invention, the pilot can also manually control, by means of the control member 1, the deployment and the folding of the thrust reversers as well as the speed of the engines when the thrust reversers are in an active deployed position.

According to the invention, such a manual implementation of the thrust reversers, referred to as the manual mode, is as follows.

First of all, it is assumed that the aircraft is in an approach phase of a runway and is in an approach configuration. The air brakes and the automatic brakes thereof are armed and the thrust reversers thereof are in an inactive folded position (the control member 1 is in the retracted position).

Figure 4C:
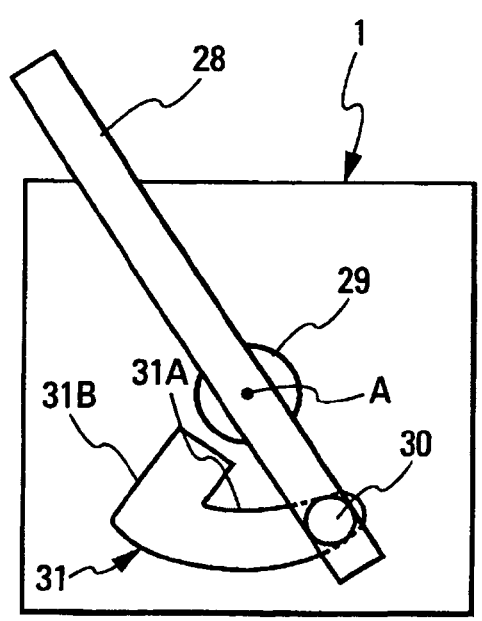
Figure 4D:
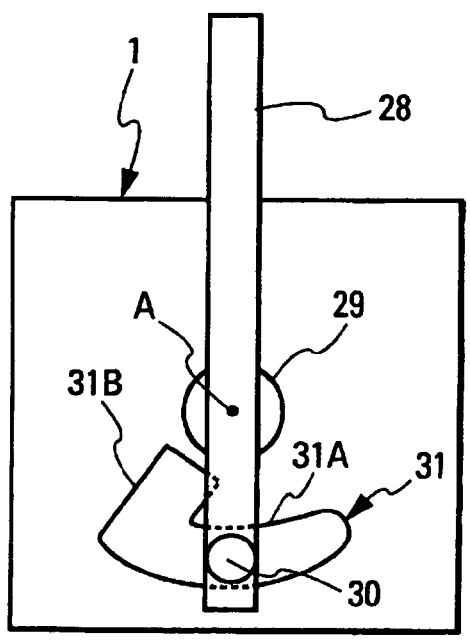

When the wheels touch the ground, the engines of the aircraft preferably being at the idling speed, the pilot can actuate the deployment of the thrust reversers while bringing the control member 1 in the half-stroke position (FIG. 4D).

As soon as the thrust reversers are in an active deployed position, the pilot can control the speed of the engines, by means of the control member 1, between the idling speed (the control member 1 is in the half-stroke position) and the authorized maximum speed when the thrust reversers are in an active deployed position (the control member 1 is occupying a full stroke position, to be further described referring to FIG. 4C) so as to check the braking of the aircraft.

When the speed of the aircraft is at the most equal to the first speed threshold, the pilot can control the folding of the thrust reversers. To this end, he first of all brings the control member 1 in the half-stroke position (FIG. 4D) so that the engines are at the idling speed. He then puts the control member 1 in the retracted position (FIG. 4A) so that the thrust reversers switch from the active deployed position to the inactive folded position.

It should be appreciated that, in the manual mode, the implementation of the thrust reversers upon a takeoff being interrupted is similar to the abovementioned one upon a landing.

Figure 2:
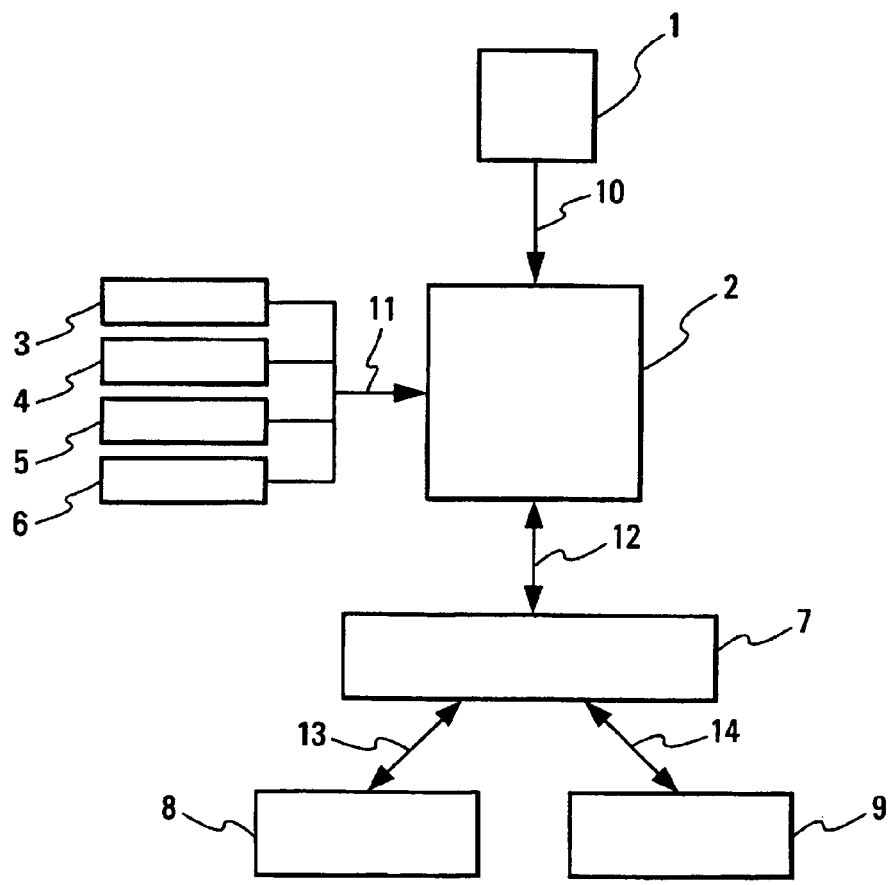
FIG. 2 schematically shows the simplified architecture of the system for automatically implementing the thrust reversers according to the invention.

As shown on FIG. 2, the control member 1 is able to generate electric signals being transmitted to a control device 2 implementing the method of the invention, via the link 10. The control device 2 is preferably integrated into the flight management system FMS of the aircraft.

The control device 2 can also, but not exclusively receive the electric signals transmitted by the flight controls 3 of the aircraft, the landing gear controls 4, the flight data devices 5 and the throttle lever device 6, via the link 11 as illustrated on FIG. 2. It can further emit and receive electric signals from a control interface 7, via the link 12.

The control interface 7 can transmit and receive electric signals from an electronic control of the engines 8, via the link 13, and from a control unit of the thrust reversers 9, via the link 14.

In the embodiment, the control device 2 more specifically comprises the following logic devices, shown by the respective FIGS. 3A to 3E as block diagrams:
- a deployment logic device 15 (FIG. 3A) allowing the deployment (step E3) of the thrust reversers to be controlled;
- a position return logic device 20 (FIG. 3B) allowing (step E4) the deployment of the thrust reversers to be checked;
- a speed application logic device 22 (FIG. 3C) associated with each engine allowing (step E5) the speed of said engine to be controlled while applying to it the predetermined speed corresponding to the reverse thrust being selected at step E1;
- a speed reduction logic device 24 (FIG. 3D) associated with each engine allowing the idling speed of said engine (step E6) to be controlled; and
- a folding logic device 26 (FIG. 3E) associated with each engine allowing the folding of the thrust reverser of said engine (step E7) to be controlled.

Figure 3A:
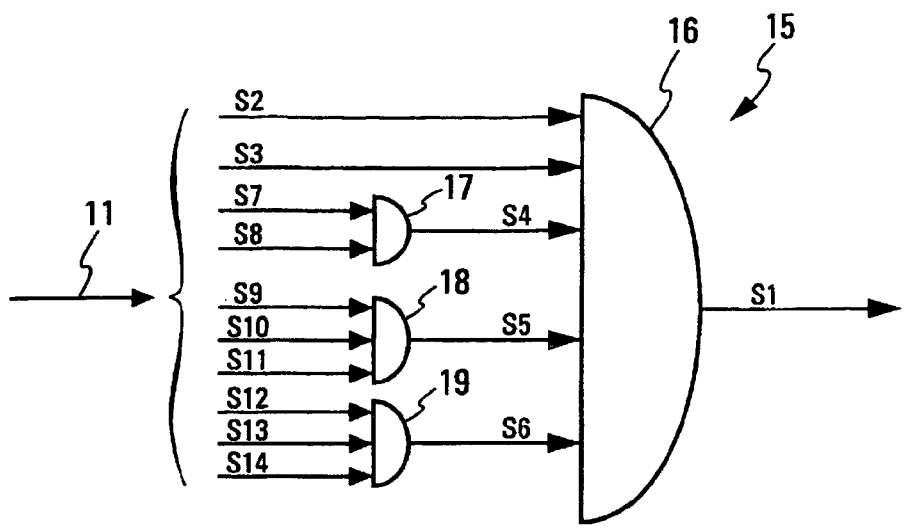
FIG. 3A shows, in the form of a block diagram, a deployment logic device integrated into the control device of the invention.

As shown on FIG. 3A, the deployment logic device 15 comprises a first AND logic gate 16 with five inputs and one output. The AND logic gate 16 can deliver a signal S1 on the output thereof when a signal is received by each of its five inputs. In such a case, the signal S1 is a control signal for the deployment of the thrust reversers being transmitted to a control interface 7 via the link 12.

As an example, the first AND logic gate 16 can receive:
- a first signal S2, representative of the idling speed position of the throttle levers of the engines of the aircraft, on its first input. When at least one of the throttle levers is not occupying the idling speed, no signal reaches this first input;
- a second signal S3, representative of the speed of the aircraft when it is higher than the first speed threshold, on its second input. No signal reaches the second input when the speed is at the most equal to the first speed threshold;

a third signal S4, representative of the armed condition of the air brakes and of the automatic brakes of the aircraft, on its third input being connected to the output of a second two input AND logic gate 17. The signal S4 is delivered in the output of the second AND logic gate 17 when a signal S7 representative of the armed condition of the air brakes, and a signal S8, representative of the armed condition of the automatic brakes, are respectively received by the first and the second input of the AND logic gate 17. In the absence of at least one of the signals S7 or S8, no signal is delivered;

a fourth signal S5, representative of the contact of the aircraft with the ground, on its fourth input being connected to the output of a third three input AND logic gate 18. The signal S5 is delivered in the output of the third AND logic gate 18 when no signal S9, representative of the altitude of the aircraft when it is at the most equal to a predetermined altitude threshold (for example 5 feet), a signal S10, representative of the speed of the wheels of the main gear when it is higher than a third predetermined speed threshold (for example 72 kts), and a signal 511, representative of the pressed condition of the main landing gear, are received respectively by its three inputs;

a fifth signal S6, representative of the armed condition of the thrust reversers of the aircraft, on its fifth input being connected to the output of a fourth three input AND logic gate 19. The signal S6 is delivered in the output of the fourth AND logic gate 19 when a signal 512, representative of the automatic position occupied by the control member 1, a signal S13, representative of the approach configuration of the aircraft, and a signal S14, representative of the selection by the pilot of a level of reverse thrust, are respectively received by its three inputs.

Figure 3B:
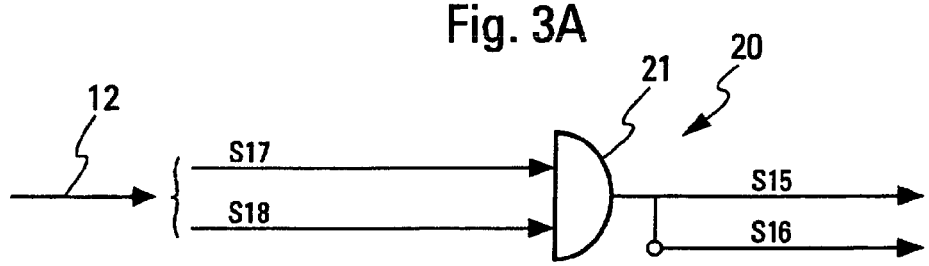
FIGS. 3B to 3E are similar to FIG. 3A and respectively show the logic devices for position return, speed application, speed reduction and folding for the control device of this invention.

As shown on FIG. 3B, the position return logic device 20 comprises a two input AND logic gate 21 delivering in the output a signal S15 for confirming the deployment of the thrust reversers when two signals S17 and S18, each representative of the deployed condition of the thrust reverser of an engine, respectively reach its two inputs. On the other hand, when at least one thrust reverser is not correctly deployed, an abnormal deployment signal S16 of the thrust reversers is transmitted in the output of the AND logic gate 21.

Figure 3C:
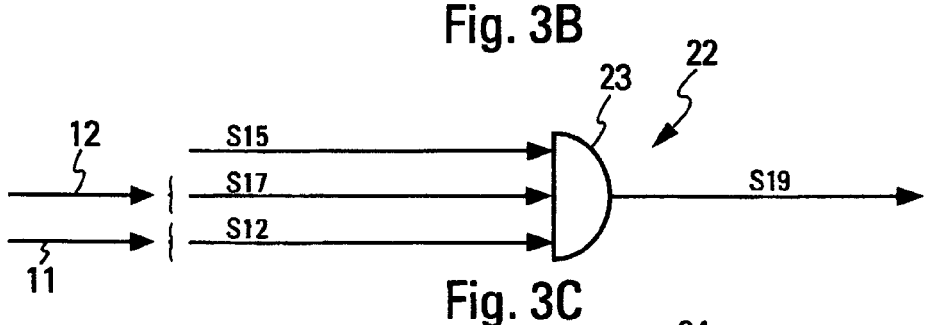

Moreover, as illustrated on FIG. 3C, each speed application logic device 22 comprises a three input AND logic gate 23. It can deliver on its output a signal S19 when the signals S15, S17 or S18 (according to the associated engine of the logic device 22) and the signal S12 are received by its three inputs. In such a case, the signal S19 is a control signal for the speed to be applied to the engine associated with the logic device 22 for obtaining, in the output of the corresponding thrust reverser, the reverse thrust (step E1) preselected by the pilot.

The signal S19 is transmitted to the control interface 7 via the link 12.

Figure 3D:
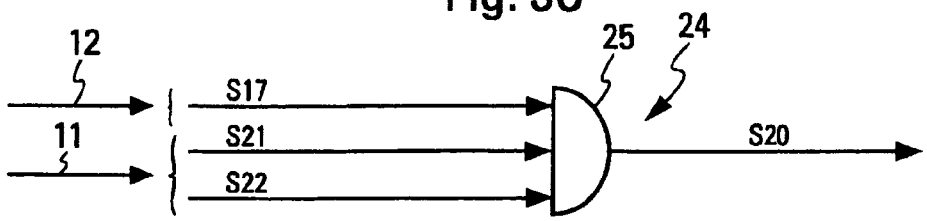

Moreover, as illustrated on FIG. 3D, each speed reduction logic device 24 comprises a three input AND logic gate 25. It can deliver in the output a signal S20 when the signal S17 or S18 (according to the engine associated with the logic device 24), a signal S21, representative of the speed of the aircraft when it is at the most equal to the first speed threshold, and a signal S22, representative of the speed of the aircraft when it is higher than a fourth predetermined speed threshold (for example 3 kts), are received by its three inputs. In such a case, the signal S20 is a control signal for reducing the speed of the engine associated with the logic device 24 so that such speed reaches the idling speed. The signal S20 is transmitted to the control interface 7 via the link 12.

Figure 3E:
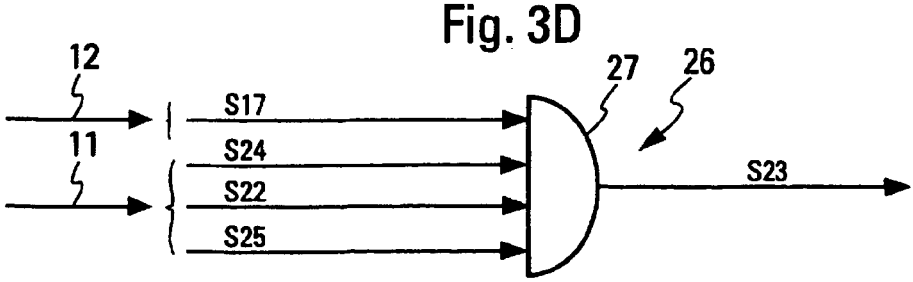

Furthermore, as shown on FIG. 3E, each folding logic device 26 comprises a four input AND logic gate 27. It can deliver in its output a signal S23 when:

the signal S17 or S18 (according to the engine associated with the logic device 26);

a signal S24, representative of the speed of the aircraft when it is at the most equal to the second speed threshold;

the signal S22;

a signal S25 or S26 (according to the engine associated with the logic device 26), each representative of the speed of an engine when it is at the idling speed;

are respectively received by its four inputs. In such a case, the signal S23 is a control signal for the folding of the thrust reverser of the engine associated with the logic device 26. The signal S23 is transmitted to the control interface 7, via the link 12, afterwards transferring such a folding control toward the control unit 9 of the thrust reversers, via the link 14.

As shown on FIGS. 4A to 4D, the control member 1 comprises preferably a lever 28 being able to slide in a mobile guide 29 able to rotate around the axis orthogonal to the sectional plane crossing A. The lever 28 comprises, at the lower end thereof, a tenon 30 able to shift in a guiding opening 31 arranged in the structure of the control member 1. The guiding opening 31 comprises a circular portion 31A with a centre A and, at its left end, a radial notch 31B wherein tenon 30 could be housed. Thus, the lever 28 can have a rotation motion of a centre A, the tenon 30 then shifts in the circular portion 31A of the guiding opening 31, and a translation motion, the tenon 30 becoming housed in the radial notch 31B.

In the preferred embodiment, the control member 1 can occupy the following positions:

the retracted position (FIG. 4A), wherein the lever 28 is fully tilted to the right, the tenon 30 is in abutment against the left end of the circular portion 31A of the guiding opening 31. In the retracted position, the thrust reversers are in an inactive folded position;

the automatic position (FIG. 4B), wherein the lever 28 has been slightly drawn upwards by the pilot from the retracted position. The tenon 30 then becomes housed into the radial notch 31B. The above-mentioned automatic mode is activated;

the full stroke position (FIG. 4C), wherein the lever 28 is fully tilted to the left. The tenon 30 is then in abutment against the right end of the circular portion 31A of the guiding opening 31. In the full stroke position, the thrust reversers are in an active deployed position and the speed of the engines reaches the authorized maximum when the reversers are deployed;

the half-stroke position, wherein the lever 28 occupies an intermediary position between the retracted position and the full stroke position. The tenon 30 is then for example at an equidistance from the two ends of the circular portion 31A. In the half-stroke position, the engines are at the idling speed and the thrust reversers are in an active deployed position.

The invention claimed is:

1. A method for implementing thrust reversers, upon a landing or a takeoff, of an aircraft provided with at least two turboengines, the speeds of which are individually controlled, between an idling speed and a full speed, by throttle levers respectively associated with said engines, said thrust reversers being controlled by at least one control member (1) for being able to switch from an inactive folded position to an active deployed position and, reversely, from said active deployed position to said inactive folded position,
wherein the successive steps are automatically performed:
a) a deployment (E3) of said beforehand armed thrust reversers when:
an actual speed of said engines is at the most equal to a low predetermined speed threshold;
the actual speed of the aircraft is higher than a first predetermined speed threshold; and
said aircraft is considered being in contact with the ground;
b) an application (E5) to said engines of a predetermined speed being at least equal to said low speed threshold as long as the speed of the aircraft is higher than said first speed threshold;
c) as soon as the speed of said aircraft is at the most equal to said first speed threshold, a reduction (E6) of the speed of said engines so that they reach a speed at the most equal to said low speed threshold;
d) then, an folding (E7) of said thrust reversers.

2. A method according to claim 1, wherein said thrust reversers are folded when the speed of said aircraft is at the most equal to a second predetermined speed threshold, said second speed threshold being lower than said first predetermined speed threshold.

3. A method according to claim 1, wherein the thrust reversers are armed if the following conditions are met:
a pilot has selected (E1) a reverse thrust corresponding to said predetermined speed to be applied to the engines at step b);
the pilot has put the control member (1) of said thrust reversers in a predefined position, referred to as an automatic position;
the aircraft is in one of the two following configurations:
an approach configuration before a landing;
a takeoff configuration.

4. A method according to claim 1, wherein, should at least one of said thrust reversers break down, a new speed to be applied at step b) is determined for each one of said engines.

5. A method according to claim 1, wherein, in the case of a landing, the thrust reversers are armed if the following conditions are met:
a pilot has recorded the landing parameters;
the pilot has put (E2) the control member (1) of said thrust reversers in a predefined position, referred to as an automatic position;
the aircraft is in an approach configuration;
and in that said speed to be applied to the engines at step b) is determined as a function of said recorded parameters and of the actual landing conditions so as to be optimal.

6. A control device (2) for implementing the method as specified in claim 1, comprising:
a deployment logic device (15) for controlling said deployment (E1) of the thrust reversers;
speed application logic devices (22) each allowing said application (E5) of the predetermined speed to one of said engines to be controlled;
speed reduction logic devices (24) each allowing said reduction (E6) of a speed of one of said engines to be controlled; and
folding logic devices (26) each allowing said folding (E7) of the thrust reverser of one of said engines to be controlled.

7. A device according to claim 6, further comprising a position return logic device (20) allowing said check (E4) of the correct deployment of said thrust reversers to be performed.

8. A device according to claim 7, wherein said device is connected, via a link (10, 11), to at least one of the following means of said aircraft:
one or more flight controls (3);
one or more controls of the landing gear (4);
one or more flight data devices (5);
a throttle lever device (6);
the control member (1) of said thrust reversers;
so as to receive signals representative of information being able to be used by said logic devices for deployment (15), speed application (22), speed reduction (24), folding (26) and position return (20).

9. A device according to claim 7, wherein said device is further connected, via a link (12), to a control interface (7) connected to an electronic control (8) of said engines and to a control unit (9) of said thrust reversers, so as to receive from said control interface (7) information signals being able to be used by said logic devices for speed application (22), speed reduction (24), folding (26) and position return (20) and to transmit to it control signals respectively from said engines and said thrust reversers.

10. An aircraft, comprising a control device (2) according to claim 6.

* * * * *